(12) United States Patent
Zayed

(10) Patent No.: US 9,961,081 B2
(45) Date of Patent: May 1, 2018

(54) SYSTEM FOR TRANSACTION AUTHENTICATION

(71) Applicant: Magic Cube, Inc., Sunnyvale, CA (US)

(72) Inventor: Nancy Zayed, Cupertino, CA (US)

(73) Assignee: MagicCube, Inc., Sunnyvale, CA (US)

( * ) Notice: Subject to any disclaimer, the term of this patent is extended or adjusted under 35 U.S.C. 154(b) by 0 days. days.

(21) Appl. No.: 14/609,057

(22) Filed: Jan. 29, 2015

(65) Prior Publication Data

US 2016/0065580 A1    Mar. 3, 2016

Related U.S. Application Data

(63) Continuation of application No. 14/502,300, filed on Sep. 30, 2014, now Pat. No. 9,009,468.

(60) Provisional application No. 62/042,148, filed on Aug. 26, 2014.

(51) Int. Cl.
| | |
|---|---|
| H04L 29/06 | (2006.01) |
| G06F 21/71 | (2013.01) |
| G06F 11/36 | (2006.01) |
| G06F 9/455 | (2018.01) |
| G06F 21/53 | (2013.01) |
| H04L 29/08 | (2006.01) |

(52) U.S. Cl.
CPC .............. H04L 63/10 (2013.01); G06F 9/455 (2013.01); G06F 11/3652 (2013.01); G06F 21/53 (2013.01); G06F 21/71 (2013.01); H04L 63/0272 (2013.01); H04L 63/12 (2013.01); H04L 67/10 (2013.01); G06F 9/45533 (2013.01); G06F 2221/03 (2013.01)

(58) Field of Classification Search
CPC ....... G06F 21/53; G06F 9/45533; H04L 67/10

USPC ..................................... 726/1, 4; 713/2, 165
See application file for complete search history.

(56) References Cited

U.S. PATENT DOCUMENTS

| | | |
|---|---|---|
| 7,664,626 B1 | 2/2010 | Ferrie |
| 8,201,732 B1 | 6/2012 | Kropf et al. |
| 8,656,482 B1 | 2/2014 | Tosa et al. |
| | (Continued) | |

OTHER PUBLICATIONS

International Search Report and Written Opinion for International Patent Application No. PCT/US2015/016313, dated Jun. 8, 2015 (9 pages).

(Continued)

*Primary Examiner* — Dao Q Ho

(74) *Attorney, Agent, or Firm* — Goodwin Procter LLP

(57) ABSTRACT

Systems and methods for secure transaction authorization are provided. An emulator is instantiated on a host device and configured to emulate an integrated circuit having a different instruction set than an integrated circuit of the host device, and a guest operating system executing on the emulated integrated circuit is configured to communicate with a host operating system of the host device through an emulated network interface of the emulator. Under control of one or more guest operating system processes executing on the emulated integrated circuit, a request is received over a first secure communication channel from an application executing on the host operating system to authorize a transaction. An authorization result is received from a remote system over a second secure communication channel, and a response is sent to the application over the first secure communication channel indicating the authorization result.

25 Claims, 3 Drawing Sheets

(56) References Cited

U.S. PATENT DOCUMENTS

| | | | |
|---|---|---|---|
| 2006/0041761 A1* | 2/2006 | Neumann | G06F 21/32 |
| | | | 713/189 |
| 2007/0250920 A1 | 10/2007 | Lindsay | |
| 2009/0044187 A1 | 2/2009 | Smith et al. | |
| 2009/0068982 A1 | 3/2009 | Chen et al. | |
| 2010/0070970 A1* | 3/2010 | Hu | G06F 9/45533 |
| | | | 718/1 |
| 2012/0023026 A1 | 1/2012 | Chen et al. | |

OTHER PUBLICATIONS

Keller, E., et al. (2010) "NoHype: Virtualized Cloud Infrastructure without the Virtualization," *ACM SIGARCH Computer Architecture News*, vol. 38, No. 3, pp. 350-361.

\* cited by examiner

SYSTEM FOR TRANSACTION AUTHENTICATION

CROSS-REFERENCE TO RELATED APPLICATION

This application is a continuation of U.S. patent application Ser. No. 14/502,300, filed on Sep. 30, 2014, and entitled "System for Transaction Authentication," which claims priority to and the benefit of U.S. Provisional Patent Application No. 62/042,148, filed on Aug. 26, 2014, and entitled "System for Transaction Authentication," the entireties of which are incorporated by reference herein.

BACKGROUND

The present disclosure relates generally to hardware and software emulation and, more particularly, to systems and methods for securely storing, capturing, and transferring sensitive information via an emulated authentication device.

Hardware-based solutions for authentication and secure data storage and transfer often require complex, customized circuitry and are slow to deploy because of design constraints, hardware incompatibilities across devices, prolonged lead times, manufacturing delays, and other roadblocks. Existing hardware-based solutions differ greatly across various mobile and other devices, which reduces their network effect and keeps the market fragmented over different approaches that are chip-based or SIM-card-based. The market would benefit from a solution for storing, exchanging, and transmitting secure information from and to any device, regardless of hardware differences.

BRIEF SUMMARY

Systems and methods for secure transaction authorization are provided. In one aspect, a computer-implemented method comprises: instantiating an emulator on a host device, wherein the emulator is configured to emulate an integrated circuit having a different instruction set than an integrated circuit of the host device; configuring a guest operating system executing on the emulated integrated circuit to communicate with a host operating system of the host device through an emulated network interface of the emulator; and under control of one or more guest operating system processes executing on the emulated integrated circuit: receiving a request over a first secure communication channel, from an application executing on the host operating system or from a remote application, to authorize a transaction; based on the received request, obtaining user input from an input device of the host device and transforming the user input to verification data; establishing a different second secure communication channel to a remote system through the emulated network interface; sending a request to the remote system over the second secure communication channel to authorize the transaction based on the verification data; receiving an authorization result from the remote system over the second secure communication channel; and sending a response to the application over the first secure communication channel indicating the authorization result. Other embodiments of this aspect include corresponding systems and computer programs.

In one implementation, the emulated integrated circuit duplicates the operation of a corresponding physical integrated circuit executing a plurality of instructions wherein the physical integrated circuit comprises a central processing unit. The emulated integrated circuit can duplicate an instruction cycle and instruction cycle timing of the physical integrated circuit.

In another implementation, instantiating the emulator on the host device comprises executing the host device in a sandbox process having a controlled set of resources that can be accessed by the emulator. Information received from the first secure communication channel can be encrypted. The input device can be a touch screen and obtaining the user input from the input device can comprise receiving a plurality of locations each indicating a location of an interaction with the touch screen.

In a further implementation, establishing a different second secure communication channel to the remote system through the emulated network interface comprises establishing a secure virtual private network between a second guest operating system process and the remote system. Configuring the emulator to communicate with the host operating system of the host device can comprise attaching a second guest operating system process to the emulated network interface wherein the second process is configured to transfer packets between the emulated network interface and the host operating system network stack. At least one of the guest operating system processes can execute in kernel space of the guest operating system. The verification data can be a credit card security code, a Quick Response Code, or information received from an integrated circuit on a credit card.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

Figure 1:
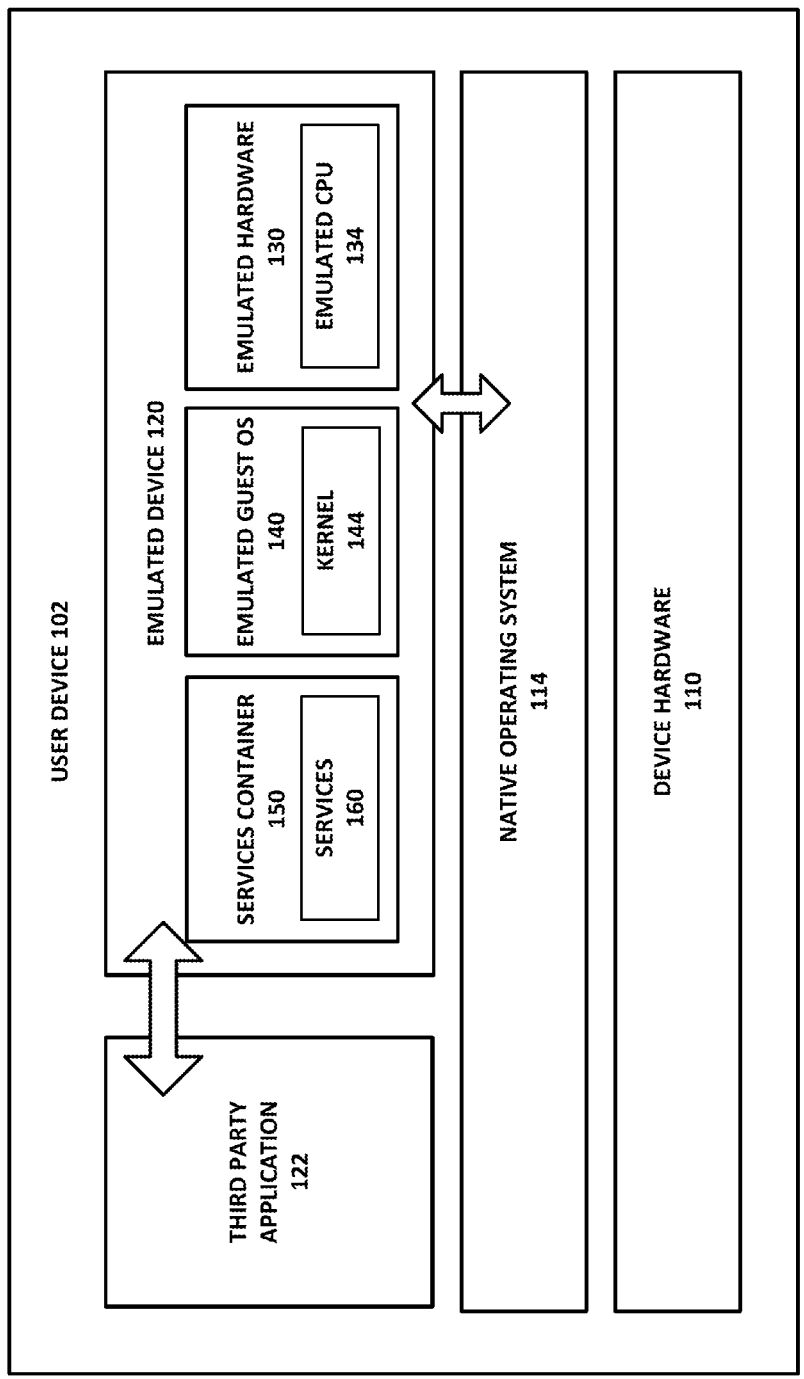
FIG. 1 is a diagram depicting a high-level system architecture of a user device and emulated device according to an implementation.

Described herein in various implementations are systems and methods for providing secure communication, secure data transfer and storage, and authentication using an emulated device. The emulated device can execute on a mobile device operating system (OS) of a host device and can enable device-based authentication services for mobile and electronic commerce merchants and service providers. For example, the emulated device can provide for financial personal-identification-number (PIN)-based authentication through a mobile application and cloud-based web services in a secure manner. In other instances, the emulated device enables the secure storage, exchange, and transmission of information to and from various forms of mobile and non-mobile devices, instruments, computers, and other systems. Further, various devices, systems, programs, instruments, and equipment can be emulated using the techniques described herein, such as, kiosks, workstations, handheld devices for point of sale systems, banking devices, automated teller machines, retail and payment systems, healthcare devices, defense and government equipment, voting and data collection devices, and other data storage and transmission devices.

Emulation refers to the use of a computer program or hardware to provide (i.e., emulate) the functionality of other software or hardware. An emulator can include modules that correspond to hardware components of an emulated device. For example, an emulator can provide emulation of a central processing unit (CPU), memory subsystem, and input/output devices. In the case of emulation by a software-based emulator, an operating system and other applications can be interpreted by the emulator, rather than being run by native hardware. A software-based emulator can also emulate a particular hardware architecture than the architecture of a host device on which the emulator executes. For example, an emulator can be configured to emulate an integrated circuit (e.g., a CPU) that has a different instruction set than a physical integrated circuit of the host device. The emulated integrate circuit can duplicates the instruction cycle and instruction cycle timing of the physical integrated circuit.

The emulated device can include emulated hardware, operating systems, software modules, applications, plugins, runtime environments, graphics engines, input/output methods, drivers, abstraction layers clients, connection protocols, security protocols, storage, memory, and virtualized peripherals. Further, the emulated device can select different CPU instructions sets for operation that can be different from the instruction set used by the CPU of the host device. In one implementation, this is achieved by randomly instantiating an emulated device having a particular instruction set architecture (ISA) and an accompanying operating system that is appropriate for the ISA.

Unlike a standard operating system, the emulated device can ensure that applications running within are unable to access the hardware of the host device. These constraints create a fully secure environment and container that shield the emulated device from unauthorized external accesses, and shield the native environment of the host device from unauthorized access by the emulated device. In particular, the emulated device provides an encrypted environment that shields the sensitive internal applications from external tampering.

Referring to FIG. 1, in one implementation, a system includes a user device 102 having a native operating system 114 executing on device hardware 110. The user device 102 can be a mobile or other device, such as a smartphone, smart watch, smart glasses, tablet computer, desktop computer, portable computer, television, gaming device, music player, mobile telephone, laptop, palmtop, smart or dumb terminal, network computer, personal digital assistant, wireless device, information appliance, workstation, minicomputer, mainframe computer, or other computing device that is operated as a general purpose computer or a special purpose hardware device that can execute the functionality described herein. The native operating system 114 can be a mobile, desktop, server, or other operating system such as an Apple iOS® platform, a Google Android™ platform, a Microsoft Windows® operating system, an Apple OS X® operating system, a Linux® operating system, a variants of a UNIX® operating system, and the like.

Device hardware 110 can include one or more processors suitable for the execution of a computer program, including both general and special purpose microprocessors. Generally, a processor receives instructions and data stored on a read-only memory or a random access memory or both. Information carriers suitable for embodying computer program instructions and data include all forms of non-volatile memory including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The user device 102 can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

In one implementation, the software includes a third party mobile application 122, which can be in the form of a standalone application, plugin, component, module, library (statically or dynamically linked), or other software object. The third party mobile application 122 can call or otherwise execute a framework or application programming interface (API) that provides for the creation and communication with an emulated device 120 (also referred to herein as an "emulator" or "emulation engine") on the user device 102. For instance, the framework/API can be provided in a library that is linked with or imported into the third party mobile application 122. The third party mobile application 122 can make a call into the framework, which instantiates the emulated device 120 on the user device 102. The emulated device 120 can include emulated hardware 130 and emulated software, such as emulated guest operating system 140. Emulated hardware 130 can include one or more emulated processors, such as emulated central processing unit (CPU) 134, emulated memories and other storage mediums, emulated input and/or output devices, emulated communications ports and other interfaces, and so on. Emulated operating system 140 can include an emulated kernel 144 and/or other system and user space elements.

The emulated guest operating system 140 can be configured to communicate with the native operating system 114 through an emulated network interface of the emulated device 120. In one implementation, communication is accomplished by attaching a guest operating system process to the emulated network interface and using the attached process to transfer data (via, e.g., transmission control protocol (TCP) packets, user datagram protocol (UDP) datagrams, internet protocol (IP) packets, and/or other network messages) between the emulated network interface and the network stack of the native operating system 114. The attached process can execute in kernel space or user space of the guest operating system. In some implementations, virtual-network kernel devices, such as network tunnel and/or network tap (TUN and/or TAP), are used to provide simulated network and link layers to facilitate communication between the guest and native operating systems 140, 114.

The emulated guest operating system 140 can also communicate with one or more remote systems via the emulated network interface and network stack of the native operating system 114, rather than utilize typical native runtime frameworks and APIs associated with the native operating system 114. In another implementation, the guest operating system 140 communicates through a virtual network adaptor that creates a secure tunnel to a remote system. Communication between the user device 102 and remote systems can take place, for example, over media such as standard telephone lines, LAN or WAN links (e.g., T1, T3, 56 kb, X.25), broadband connections (ISDN, Frame Relay, ATM), and/or wireless links (802.11 (Wi-Fi), Bluetooth, ZigBee, Z-Wave, GSM, TD-CDMA, TD-SCDMA, CDMA, SMS over radio, fiber optics, etc.). Other communication media are contemplated. The network can carry TCP/IP protocol communications, HTTP/HTTPS transmissions, and so on, and the connection between the user device 102 and remote systems can be communicated over such TCP/IP networks. Other communication protocols are contemplated. Further, the communication between the user device 102 and a remote system can be encrypted/decrypted using known and/or custom encryption/decryption algorithms.

In one embodiment, the emulated device 120 enables a secure boot mode for the emulated guest operating system 140 by providing to a virtualized Trusted Platform Module (TPM) a specialized token generated by the emulated device 120. The specialized token can be watermarked to the user device 102 and/or software (e.g., third party mobile application 122) that utilizes the emulation system.

In some implementations, authorized access for certain mobile clients and backend/cloud servers can be accomplished through secure frameworks/APIs that implement opaque data models. In some instances, the third party mobile application 114 is not permitted to use services provided via the framework until after a combination of the application 114 and the user device 102 has been validated as a legitimate user platform. For example, if an end user is instructed by his service provider (e.g., bank, merchant, medical institution) to download an application that uses the framework, and the framework subsequently detects that the device 102 is compromised (e.g., is jail-broken, has questionable software, etc.), then the framework can refuse to allow the application from accessing a remote system operated by the framework provider. The remote system can also communicate with the service provider's backend systems to alert it of the questionable status of that particular device 102 for that particular user.

The emulated device 120 can also include services container 150, in which one or more services 160 can execute. The services 160 can include, but are not limited to, secure input/output, virtual private network (VPN) communication, storage, key management, Quick Response Code (QRC) management, near field communication (NFC), host card emulation (HCE), payment token management, malware protection, virus detection, and other security and storage services.

In one implementation the emulated device 120 is executed in a sandbox process having a controlled set of resources (e.g., memory, storage space, processors, processor cycles, etc.) that can be accessed by the emulated device 120. A sandbox can be, for example, a mechanism or space for running programs or executing instructions such that access by software executing inside the sandbox to software and/or hardware outside the sandbox is restricted. In some instances, the services container 150 includes one or more secondary sandboxes in which the services 160 can be executed.

Additionally or alternatively, some functionality can be performed remotely, in the cloud, or via software-as-a-service. The remote functionality can execute on server class computers that have sufficient memory, data storage, and processing power and that run a server class operating system (e.g., Oracle® Solaris®, GNU/Linux®, and the Microsoft® Windows® family of operating systems).

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
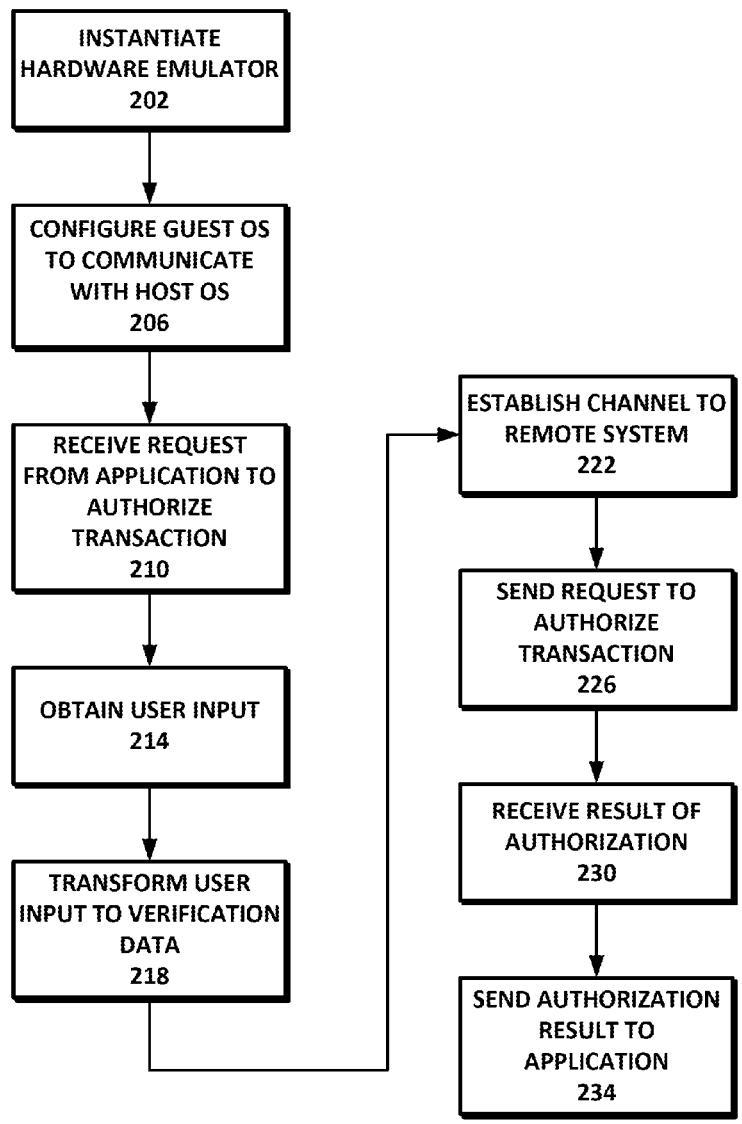
FIG. 2 is a flowchart depicting a method for secure authentication according to an implementation.
Figure 3:
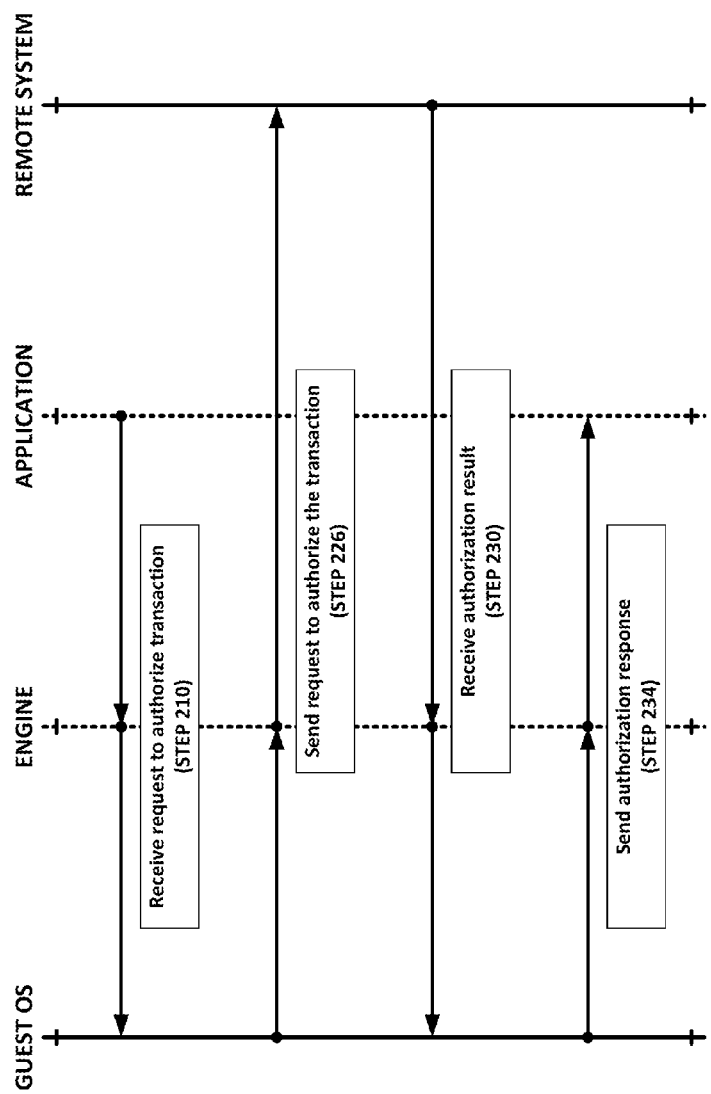
FIG. 3 is a diagram depicting an example network communication flow according to an implementation.

Referring now to FIGS. 2 and 3, in one implementation, one or more secure communication channels are created in order to authorize a transaction, such as a purchase, an account login, a secure data transfer, or other transmission, request for, or receipt of data or property requiring a form of authentication. In general, a secure communication channel refers to a connection between two or more endpoints for the transfer (sending and/or receiving) of data in a secure manner (e.g., by encrypting the data). Examples of secure communication channels include virtual private networks (VPNs), transport layer security (TLS) and secure sockets layer (SSL) tunnels, IP security (IPsec) transmission, and other forms of secure communication.

In STEP 202, a client application (e.g., third party mobile application 122) makes a call to a framework linked to the client application, and the framework instantiates an emulator (e.g., emulated device 120) on a host device (e.g., user device 102). The emulator can include emulated hardware and software, and can reproduce the instructions of an integrated circuit (e.g., emulated CPU 134) that has a different instruction set than a particular integrated circuit (e.g., CPU in device hardware 110) in the host device. A guest operating system executing on the emulated integrated circuit (e.g., emulated guest OS 140) is configured to communicate with a host operating system (e.g., native operating system 114) executing on the host device through an emulated network interface of the emulator (STEP 206).

Communication operations can then be performed under the control of one or more guest operating system processes executing on the emulated integrated circuit. A first communication channel can be established when the client application makes an initialization call to the framework. The initialization call can validate communication over the channel using a combination of, for example, device information and a watermark associated with the framework implementation. The first secure communication channel can be formed, for example, between the host operating system and a guest operating system process attached to an emulated network interface of the guest operating system.

In STEP 210, the guest operating system receives a request to authorize a transaction over the first secure communication channel and sourced from the client application executing on the host operating system (e.g., third party mobile application 122). Various types of requests can be made via the framework, including a request to authorize the use of a service provided by or through the emulator, a request to determine if there is a secret associated with the use of an instrument (e.g., information associated with a credit card), and a request to verify the validity of a secret (e.g., the validity of a credit card number captured by the emulator).

In STEP 214, based on the received request for authorization, the guest operating system obtains user input from an input device of the host device and, in STEP 218, transforms the user input to verification data. The guest operating system can further validating the verification data with a system of a service provider that maintains a definitive identity of the user. Verification data refers to data that authenticates the identity of the user of the client application and can include, for example, a credit card security code (CSC), a QRC, date of birth, a shared secret, visual recognition, a biometric identifier, and/or information received from a magnetic stripe or an integrated circuit (e.g., an embedded microchip) on a payment card.

In one implementation, the input device is a touchscreen, and the user input is a plurality of locations on the touch screen, each indicating a location of a user's interaction with the touch screen (e.g., the user's entry of numbers on a digital keypad). More specifically, the guest operating system can create a screen buffer for a virtual input device representing a touchscreen graphical device and can draw to the buffer to create the appropriate representation of user controls (e.g., a keypad). The framework can incorporate a remote display and/or control protocol or other technique so that a user looking at the display of the user device can see and/or control the display of a different or remote device. The user input based on the user's interactions is captured and directed to application-specific modules running in the guest operating system as kernel modules and/or user-space processes which can encode and transmit the captured input.

The input device can also be, for example, a built-in device (e.g., a touchpad, pointing stick, click wheel, camera, microphone, gyroscope, accelerometer, built-in keyboard, etc.), and/or an separate input peripheral coupled to the host device (e.g., mouse, keyboard, trackball, joystick, camera, microphone, game controller, virtual headset, etc.). The user input can be, for example, a touchscreen gesture, a mouse gesture, a tap, a click, a click-and-drag, a tracked eye movement, a button press, a video feed of the user's face, an applied pressure, or other action suitable for allowing a user to provide input to the host device.

The guest operating system then establishes a second secure communication channel to a remote system (e.g., a system operated by the framework provider) through the emulated network interface (STEP 222). The communication channel to the remote system can be, for example, a secure VPN between a new or existing guest operating system process and the remote system, and communication can be achieved over the second channel using a RESTful (conforming to representational state transfer architectural constraints) API. Once the channel to the remote system is established, the guest operating system sends a request to the remote system to facilitate authorization of the transaction based on the verification data (STEP 226).

In some implementations, the remote system does not itself authorize the transaction, but securely transmits the verification data to an authentication authority associated with the transaction. For example, in the case of a financial transaction, the user can enter a personal identification number (PIN) for a payment card, which is securely captured and transmitted by the guest operating system to the remote system. The remote system can then forward the PIN to the financial network system associated with the payment card for authentication. In some cases, a response is received if the PIN is determined to be valid or invalid. In other instances, if the PIN cannot be verified, the transaction can be passed through to an existing system in the associated financial network that will reject the transaction.

In STEP 230, the guest operating system receives an authorization result (e.g., allow or deny) from the remote system over the second secure communication channel and, in STEP 234, sends a response indicating the authorization result to the application executing on the host operating system over the first secure communication channel. In some implementations, the framework can detect that the user device has been compromised and signal to the remote system to stop accepting requests from the device. The remote system can also alert other systems that are responsible for transaction authorization, informing them that the user device should be denied authorization or otherwise banned from performing transactions.

An example transaction using the present system and techniques will now be described. A user, Sally, downloads an mobile e-commerce application for electronic retailer, Mega-mart, onto her smartphone. The e-commerce application interfaces with a Mega-mart-branded mobile wallet application that integrates the authorization framework/API described herein, allowing Sally to securely purchase Mega-mart goods with, for example, credit cards that Sally has registered with the mobile wallet application. Upon checkout in the e-commerce application, the mobile wallet application calls an initialization function via the framework and passes Sally's credit card information, among other data, as parameters. The initialization function examines the local environment of the smartphone to determine if it is secure (e.g., not jail-broken or having suspicious software) and, if the environment is secure, the function instantiates an emulation engine and environment and passes the parameter data to the appropriate guest operating services and modules (hereinafter referred to as the "gOM").

The gOM encodes and encrypts the parameter data and sends it to the framework provider's remote backend system (hereinafter referred to as the "BE"). The BE creates the appropriate data structures to store information about Sally if it determines she is a new user. The BE then communicates with one or more financial systems to determine which, if any, of the cards can use a PIN for authentication, and returns a response to the gOM, marking which of the cards are PIN-capable. The gOM relays this information to the emulation engine which, in turn, relays it to the e-commerce application. The mobile wallet application can then display to the user an interface that allows the user to selected a preferred PIN-capable credit card for payment and, upon the user's selection, calls a transaction authorization function in the framework with the selected card as a parameter. The gOM then activates a PIN-capturing interface (e.g., virtual keypad) and sends the captured PIN to the BE, which formulates a response based on the capabilities of the backend system of the card issuer. The mobile wallet application then continues its normal transaction flow per the experience defined by Mega-mart.

Further, upon checkout, the e-commerce application can call a RESTful API initialization function on the BE, passing as parameters Sally's credit card information. The initialization function determines if Sally exists as a user in the BE and, if not, directs the e-commerce application to instruct Sally to download Mega-mart's mobile wallet application. Once the mobile wallet application is installed on Sally's smartphone, the BE sends a notification service to the mobile wallet application, with the results as an encrypted payload of the notification request. The wallet application then makes a call to a data processing function in the framework, passing it the contents of the notification payload. The data processing function receives the payload and checks the integrity of the smartphone platform. If the platform fails the integrity check, the BE can be notified of the failure, and the BE can also inform other remote systems of the failure in order to blacklist the device. If the platform is determined to be intact, the data processing function responds to the mobile wallet application to show a payment screen and instantiates the emulation engine, passing it the received data (notification payload) for provision to the appropriate gOM. The gOM activates the PIN-capturing device and sends any captured data immediately to the BE, which logs the transaction and instructs the gOM to proceed normally. The gOM relays the positive response to the emulation engine, which, in turn, relays it to the mobile wallet application. The mobile wallet application then continues its normal transaction flow per the experience designed by Mega-mart.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
instantiating an emulator on a host device having a host operating system and processor hardware implementing a first instruction set architecture, wherein the emulator is configured to emulate, in software, different processor hardware implementing one or more second instruction set architectures not including the first instruction set architecture, wherein each instruction set architecture defines addressing modes exception handling and register sets used for operating specific processor hardware;
configuring a guest operating system, that executes on the emulator using at least one of the second instruction set architectures of the emulated processor hardware, to communicate through an emulated network interface of the emulator, wherein the emulated network interface is configured to facilitate transfer of data to and from the guest operating system via a network stack of the host operating system;
configuring the emulator to disengage from the host device such that the guest operating system and applications executing on the guest operating system do not have unauthorized access to software and hardware of the host device; and
receiving input data by a guest operating system process that executes, using at least one of the second instruction set architectures of the emulated processor hardware, on the guest operating system.

2. The method of claim 1, wherein the emulated processor hardware comprises an emulated integrated circuit that duplicates the operation of a corresponding physical integrated circuit executing a plurality of instructions.

3. The method of claim 2, wherein the emulated integrated circuit duplicates an instruction cycle and instruction cycle timing of the physical integrated circuit.

4. The method of claim 1, wherein instantiating the emulator on the host device comprises executing the emulator in a sandbox process having a controlled set of resources that can be accessed by the emulator.

5. The method of claim 1, wherein the host device comprises an embedded device.

6. The method of claim 1, wherein the input data is received from a user via an input device built into the host device.

7. The method of claim 1, wherein the input data comprises personal data associated with a user.

8. The method of claim 1, wherein the guest operating system process executes in kernel space or user space of the guest operating system.

9. The method of claim 1, further comprising:
establishing a secure communication channel to a remote system through the emulated network interface; and
transmitting the input data to the remote system through the secure communication channel.

10. The method of claim 9, wherein establishing the secure communication channel to the remote system comprises establishing a secure virtual private network between a guest operating system process and the remote system.

11. The method of claim 9, further comprising receiving a response to the input data from the remote system through the secure communication channel.

12. The method of claim 1, further comprising securely storing the input data on at least one of a storage medium of the host device and a remotely located storage medium.

13. The method of claim 1, wherein each instruction set architecture comprises an instruction set for operating specific processor hardware.

14. A system comprising:
- a memory for storing computer-executable instructions; and
- a processor for executing the instructions stored on the memory, wherein execution of the instructions results in the processor performing operations comprising:
  - instantiating an emulator on a host device having a host operating system and processor hardware implementing a first instruction set architecture, wherein the emulator is configured to emulate, in software, different processor hardware implementing one or more second instruction set architectures not including the first instruction set architecture, wherein each instruction set architecture defines addressing modes exception handling and register sets used for operating specific processor hardware;
  - configuring a guest operating system, that executes on the emulator using at least one of the second instruction set architectures of the emulated processor hardware, to communicate through an emulated network interface of the emulator, wherein the emulated network interface is configured to facilitate transfer of data to and from the guest operating system via a network stack of the host operating system;
  - configuring the emulator to disengage from the host device such that the guest operating system and applications executing on the guest operating system do not have unauthorized access to software and hardware of the host device; and
  - receiving input data by a guest operating system process that executes, using at least one of the second instruction set architectures of the emulated processor hardware, on the guest operating system.

15. The system of claim 14, wherein the emulated processor hardware comprises an emulated integrated circuit that duplicates the operation of a corresponding physical integrated circuit executing a plurality of instructions.

16. The system of claim 15, wherein the emulated integrated circuit duplicates an instruction cycle and instruction cycle timing of the physical integrated circuit.

17. The system of claim 14, wherein instantiating the emulator on the host device comprises executing the emulator in a sandbox process having a controlled set of resources that can be accessed by the emulator.

18. The system of claim 14, wherein the host device comprises an embedded device.

19. The system of claim 14, wherein the input data is received from a user via an input device built into the host device.

20. The system of claim 14, wherein the input data comprises personal data associated with a user.

21. The system of claim 14, wherein the guest operating system process executes in kernel space or user space of the guest operating system.

22. The system of claim 14, wherein the operations further comprise:
- establishing a secure communication channel to a remote system through the emulated network interface; and
- transmitting the input data to the remote system through the secure communication channel.

23. The system of claim 22, wherein establishing the secure communication channel to the remote system comprises establishing a secure virtual private network between a guest operating system process and the remote system.

24. The system of claim 22, wherein the operations further comprise receiving a response to the input data from the remote system through the secure communication channel.

25. The system of claim 14, wherein the operations further comprise securely storing the input data on at least one of a storage medium of the host device and a remotely located storage medium.

* * * * *